(12) United States Patent
Zhang

(10) Patent No.: US 11,675,161 B2
(45) Date of Patent: Jun. 13, 2023

(54) CAMERA OPTICAL LENS

(71) Applicant: AAC Optics Solutions Pte. Ltd., Singapore (SG)

(72) Inventor: Kaidi Zhang, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 389 days.

(21) Appl. No.: 16/896,236

(22) Filed: Jun. 9, 2020

(65) Prior Publication Data

US 2021/0263264 A1   Aug. 26, 2021

(30) Foreign Application Priority Data

Feb. 24, 2020 (CN) .......................... 202010111330.3

(51) Int. Cl.
*G02B 9/60* (2006.01)
*G02B 13/00* (2006.01)
*G02B 13/18* (2006.01)

(52) U.S. Cl.
CPC ........... *G02B 9/60* (2013.01); *G02B 13/0045* (2013.01); *G02B 13/18* (2013.01)

(58) Field of Classification Search
CPC ... G02B 9/34; G02B 9/36; G02B 9/60; G02B 9/62; G02B 9/64; G02B 13/0045; G02B 13/005; G02B 13/006

USPC ................. 359/771, 775, 779, 764, 754–757
See application file for complete search history.

(56) References Cited

U.S. PATENT DOCUMENTS

| 3,647,281 A | * | 3/1972 | Ikeda | ..................... G02B 13/02 359/747 |
| 7,253,972 B2 | * | 8/2007 | Fujisaki | ................. G02B 13/02 359/779 |
| 2002/0097994 A1 | * | 7/2002 | Yoneyama | ............. G03B 17/00 396/79 |
| 2006/0114577 A1 | * | 6/2006 | Nishina | ..................... G02B 9/36 359/771 |
| 2015/0248016 A1 | * | 9/2015 | Sakai | ................... G02B 27/646 359/557 |
| 2020/0174233 A1 | * | 6/2020 | Iwamoto | .................. G02B 9/10 |

* cited by examiner

*Primary Examiner* — Zachary W Wilkes
(74) *Attorney, Agent, or Firm* — W&G Law Group

(57) ABSTRACT

The present disclosure a camera optical lens comprising, from an object side to an image side, a first lens having a positive refractive power, a second lens having a positive refractive power, a third lens having a negative refractive power, a fourth lens having a negative refractive power, and a fifth lens having a positive refractive power, the second lens is bonded to the third lens, the camera optical lens satisfying conditions of 0.35≤f1/f≤0.75. The camera optical lens can achieve excellent optical characteristics while meeting the designing requirement for having a large aperture and a long focal length, and being ultra-thin.

9 Claims, 8 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structure gradually appear in lens designs. There is an urgent need for an ultra-thin camera optical lens having a long focal length and achieving excellent optical characteristics.

SUMMARY

In view of the problems, the present disclosure aims to provide a camera lens, which can achieve a high imaging performance while satisfying design requirements for ultra-thin lenses having a long focal length and achieving excellent optical characteristics.

In an embodiment, the present disclosure provides a camera optical lens comprising, from an object side to an image side: a first lens having a positive refractive power; a second lens having a positive refractive power; a third lens having a negative refractive power; a fourth lens having a negative refractive power; and a fifth lens having a positive refractive power; the second lens is bonded to the third lens; wherein the camera optical lens satisfies following conditions: $0.35 \leq f1/f \leq 0.75$; where f denotes a focal length of the camera optical lens; and f1 denotes a focal length of the first lens.

The present disclosure can achieve ultra-thin lens having a long focal length and achieving excellent optical characteristics, which are especially suitable for camera lens assembly of mobile phones and WEB camera lenses formed by CCD, CMOS and other imaging elements for high pixels.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

The present disclosure will be further described with reference to the accompanying drawings and embodiments in the following.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
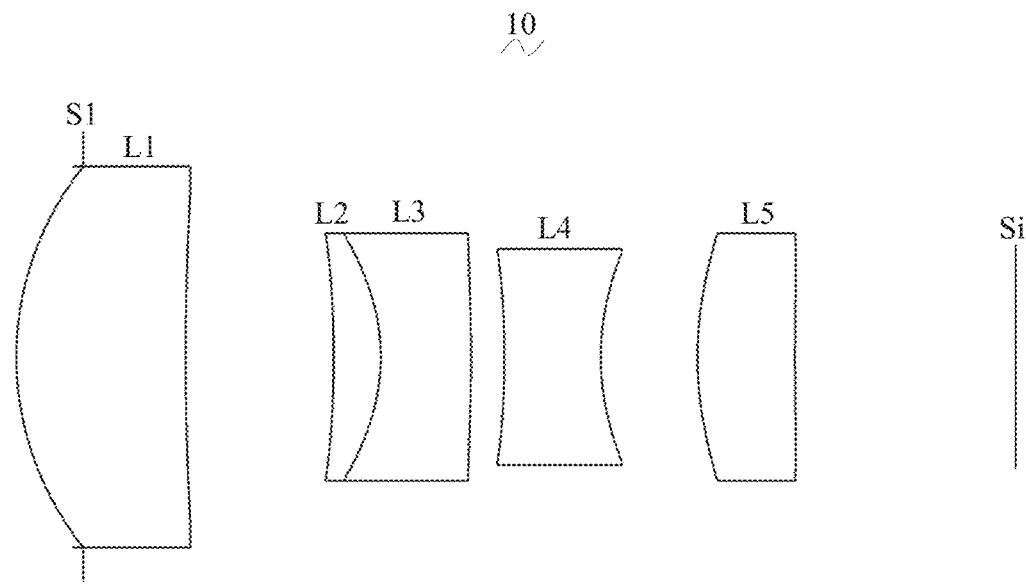
FIG. 1 is a schematic diagram of a structure of a camera optical lens according to Embodiment 1 of the present disclosure.

Referring to FIGS. 1-4, the present disclosure provides a camera optical lens 10 of Embodiment 1 of the present disclosure. In FIG. 1, the left side is an object side and the right side is an image side. The camera optical lens 10 includes five lenses, and specifically includes, from the object side to the image side: an aperture S1, a first lens L1, a second lens L2, a third lens L3, a fourth lens L4 and a fifth lens L5. In an embodiment, the first lens L1 has a positive refractive power; the second lens L2 has a positive refractive power; the third lens L3 has a negative refractive power; the fourth lens L4 has a negative refractive power; the fifth lens L5 has a positive refractive power.

Here, a focal length of the entire camera optical lens is defined as f, a focal length of the first lens L1 is defined as f1, and the camera optical lens 10 satisfies the following conditions:

$$0.35 \leq f1/f \leq 0.75 \tag{1}$$

The second lens is bonded to the third lens, so as to lower the sensitivity of the lens. The condition (1) specifies a range of a ratio of the focal length of the first lens to the focal length of the entire camera optical lens, so as to improve the focal length of the system.

An on-axis distance from the image-side surface of the first lens L1 to the object-side surface of the second lens L2 is defined as d2, and an on-axis distance from the image-side surface of the third lens L3 to the object-side surface of the fourth lens L4 is defined as d6. The camera optical lens 10 further satisfies a condition of $3.50 \leq d2/d6 \leq 6.00$, such that the bonded lens assembly can be effectively distributed, and installation of the lenses is facilitated.

A focal length of the second lens L2 is defined as f2. The camera optical lens 10 further satisfies a condition of $0.30 \leq f2/f \leq 0.50$, which specifies a range of a ratio of the focal length of the second lens to the focal length of the entire camera optical lens, so as to improve the imaging quality of the system.

In an embodiment, the object-side surface of the first lens L1 is convex in a paraxial region, and the image-side surface of the first lens L1 is concave in the paraxial region.

A curvature radius of an object-side surface of the first lens L1 is defined as R1, a curvature radius of an image-side surface of the first lens L1 is defined as R2, and the camera optical lens 10 further satisfies a condition of $-3.67 \leq (R1+R2)/(R1-R2) \leq -0.58$. This can reasonably control a shape of the first lens L1 in such a manner that the first lens L1 can effectively correct a spherical aberration of the camera optical lens. Preferably, the camera optical lens 10 further satisfies a condition of $-2.29 \leq (R1+R2)/(R1-R2) \leq -0.73$.

An on-axis thickness of the first lens L1 is defined as d1, a total optical length from the object side surface of the first lens L1 to an image surface S1 of the camera optical lens along an optical axis is defined as TTL, and the camera optical lens 10 further satisfies a condition of $0.06 \leq d1/TTL \leq 0.25$. This can facilitate achieving ultra-thin lenses. Preferably, the camera optical lens 10 further satisfies a condition of $0.10 \leq d1/TTL \leq 0.20$.

In an embodiment, an object-side surface of the second lens L2 is concave in the proximal region, and an image-side surface of the second lens L2 is convex in the proximal region.

A curvature radius of the object-side surface of the second lens L2 is defined as R3, a curvature radius of the image-side surface of the second lens L2 is defined as R4, and the camera optical lens 10 further satisfies a condition of $0.33 \leq (R3+R4)/(R3-R4) \leq 3.40$, which specifies a shape of the second lens L2. Within this range, a development towards ultra-thin lenses would facilitate correcting the problem of an axis aberration. Preferably, the camera optical lens 10 further satisfies a condition of $0.53 \leq (R3+R4)/(R3-R4) \leq 2.72$.

An on-axis thickness of the second lens L2 is defines as d3, and the camera optical lens 10 further satisfies a condition of $0.02 \leq d3/TTL \leq 0.13$. This can facilitate achieving ultra-thin lenses. Preferably, the camera optical lens 10 further satisfies a condition of $0.04 \leq d3/TTL \leq 0.11$.

In an embodiment, an object-side surface of the third lens L3 is concave in the proximal region, and an image-side surface of the third lens L3 is convex in the proximal region.

A focal length of the third lens L3 is defined as f3, and the camera optical lens 10 further satisfies a condition of $-1.20 \leq f3/f \leq -0.13$. An appropriate distribution of the negative refractive power leads to a better imaging quality and a lower sensitivity. Preferably, the camera optical lens 10 further satisfies a condition of $-0.75 \leq f3/f \leq -0.16$.

A curvature radius of the object-side surface of the third lens L3 is defined as R5, a curvature radius of the image-side surface of the third lens L3 is defined as R6, and the camera optical lens 10 further satisfies a condition of $-3.57 \leq (R5+R6)/(R5-R6) \leq -0.60$. This specifies a shape of the third lens L3, thereby facilitating shaping of the third lens. Within this range, a deflection degree of the light passing through the lens can be alleviated to effectively reduce the aberration. Preferably, the camera optical lens 10 further satisfies a condition of $-2.23 \leq (R5+R6)/(R5-R6) \leq -0.75$.

An on-axis thickness of the third lens L3 is defined as d5, and the camera optical lens 10 further satisfies a condition of $0.02 \leq d5/TTL \leq 0.14$. This can facilitate achieving ultra-thin lenses. Preferably, the camera optical lens 10 further satisfies a condition of $0.04 \leq d5/TTL \leq 0.11$.

In an embodiment, an object-side surface of the fourth lens L4 is concave in the proximal region, and an image-side surface of the fourth lens L4 is concave in the proximal region.

A focal length of the fourth lens L4 is defined as f4, and the camera optical lens 10 further satisfies a condition of $-0.74 \leq f4/f \leq -0.18$. The appropriate distribution of negative refractive power makes it possible that the system has the better imaging quality and the lower sensitivity. Preferably, the camera optical lens 10 further satisfies a condition of $-0.46 \leq f4/f \leq -0.22$.

A curvature radius of the object-side surface of the fourth lens L4 is defined as R7, a curvature radius of the image-side surface of the fourth lens L4 is defined as R8, and the camera optical lens 10 further satisfies a condition of $0.25 \leq (R7+R8)/(R7-R8) \leq 1.47$, which specifies a shape of the fourth lens L4. Within this range, a development towards ultra-thin lens would facilitate correcting a problem like an off-axis aberration. Preferably, the camera optical lens 10 further satisfies a condition of $0.41 \leq (R7+R8)/(R7-R8) \leq 1.17$.

An on-axis thickness of the fourth lens L4 is defined as d7, and the camera optical lens 10 further satisfies a condition of $0.04 \leq d7/TTL \leq 0.16$. This can facilitate achieving ultra-thin lenses. Preferably, the camera optical lens 10 further satisfies a condition of $0.07 \leq d7/TTL \leq 0.13$.

In an embodiment, an object-side surface of the fifth lens L5 is convex in the proximal region, and an image-side surface of the fifth lens L5 is concave in the proximal region.

A focal length of the fifth lens L5 is defined as f5, and the camera optical lens 10 further satisfies a condition of $0.23 \leq f5/f \leq 1.12$, which can effectively make a light angle of the camera lens gentle and reduce a tolerance sensitivity. Preferably, the camera optical lens 10 further satisfies a condition of $0.36 \leq f5/f \leq 0.90$.

A curvature radius of the object-side surface of the fifth lens L5 is defined as R9, a curvature radius of the image-side surface of the fifth lens L5 is defined as R10, and the camera optical lens 10 further satisfies a condition of $-3.92 \leq (R9+R10)/(R9-R10) \leq -0.37$, which specifies a shape of the fifth lens L5. Within this range, lens processing is facilitated.

Preferably, the camera optical lens 10 further satisfies a condition of $-2.45 \leq (R9+R10)/(R9-R10) \leq -0.46$.

An on-axis thickness of the fifth lens L5 is defined as d9, and the camera optical lens 10 further satisfies a condition of $0.04 \leq d9/TTL \leq 0.17$. This can facilitate achieving ultra-thin lenses. Preferably, the camera optical lens 10 further satisfies a condition of $0.07 \leq d9/TTL \leq 0.14$.

In an embodiment, an image height of the entire camera optical lens 10 is defined as IH, and the camera optical lens 10 further satisfies a condition of $f/IH \geq 10.00$.

In an embodiment, the camera optical lens 10 has a large aperture, and an F number Fno of the camera optical lens 10 is less than or equal to 3.00. The camera optical lens 10 has a better imaging performance.

In an embodiment, the camera optical lens 10 further satisfies a condition of $TTL/f \leq 1.00$, thereby achieving ultra-thin lenses.

In an embodiment, a combined focal length of the first lens L1 and the second lens L2 is defined as f12, and the camera optical lens 10 further satisfies a condition of $0.13 \leq f12/f \leq 0.61$. Within this range, the aberration and distortion of the camera optical lens 10 can be eliminated, and a back focal length of the camera optical lens 10 can be suppressed to maintain the miniaturization of the image lens system. Preferably, the camera optical lens 10 further satisfies a condition of $0.21 \leq f12/f \leq 0.49$.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (the total optical length from the object side surface of the first lens to the image surface of the camera optical lens along the optical axis) in mm.

Preferably, inflexion points and/or arrest points can be arranged on the object-side surface and/or the image-side surface of the lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|     | R       | d    |     | nd     |    | vd    |
|-----|---------|------|-----|--------|----|-------|
| S1  | ∞       | d0=  | 0.000 |      |    |       |
| R1  | 7.678   | d1=  | 4.600 | nd1  | 1.5440 | v1 | 56.04 |
| R2  | 79.235  | d2=  | 4.021 |      |    |       |
| R3  | −29.068 | d3=  | 1.285 | nd2  | 1.5233 | v2 | 54.52 |
| R4  | −4.961  | d4=  | 0.000 |      |    |       |
| R5  | −4.961  | d5=  | 2.450 | nd3  | 1.6614 | v3 | 20.41 |
| R6  | −38.614 | d6=  | 0.908 |      |    |       |
| R7  | −23.750 | d7=  | 2.620 | nd4  | 1.5345 | v4 | 57.09 |
| R8  | 6.412   | d8=  | 2.630 |      |    |       |
| R9  | 9.062   | d9=  | 2.650 | nd5  | 1.6614 | v5 | 20.41 |
| R10 | 72.144  | d10= | 6.000 |      |    |       |

In the table, meanings of various symbols will be described as follows.

S1: aperture;
R: curvature radius of an optical surface, a central curvature radius for a lens;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the fifth lens L5;
R10: curvature radius of the image-side surface of the fifth lens L5;
d: on-axis thickness of a lens and an on-axis distance between lens;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the optical filter GF;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5.

Table 2 shows aspherical surface data of the camera optical lens 10 in Embodiment 1 of the present disclosure.

TABLE 2

|    | Conic coefficient | Aspheric surface coefficients | | | |
|----|-------------------|------------|------------|------------|------------|
|    | k                 | A4         | A6         | A8         | A10        |
| R1 | −2.4354E−01       | 4.9259E−05 | 4.7667E−07 | 1.6266E−08 | −5.0867E−10 |
| R2 | 1.1019E+02        | 4.3951E−05 | −1.3860E−06 | −4.1577E−08 | −1.7008E−09 |
| R3 | −1.8514E+01       | −2.7341E−04 | −1.2130E−05 | 8.1971E−08 | −4.2784E−08 |
| R4 | −3.6273E−01       | 1.4706E−03 | −3.1465E−05 | −5.8927E−07 | 1.5186E−07 |

TABLE 2-continued

| | | | | |
|---|---|---|---|---|
| R5 | −3.6273E−01 | 1.4706E−03 | −3.1465E−05 | −5.8927E−07 | 1.5186E−07 |
| R6 | −7.1477E+01 | 5.1337E−04 | −3.8152E−06 | −4.9232E−07 | −3.4974E−08 |
| R7 | 3.3170E+01 | 0.0000E+00 | 0.0000E+00 | 0.0000E+00 | 0.0000E+00 |
| R8 | −1.5254E+00 | 0.0000E+00 | 0.0000E+00 | 0.0000E+00 | 0.0000E+00 |
| R9 | −1.5020E+00 | −1.0503E−04 | −1.3660E−05 | 7.7478E−08 | −2.4102E−08 |
| R10 | −4.0827E+01 | −4.0875E−04 | −8.7948E−06 | −1.4372E−06 | 5.8870E−08 |

| Aspheric surface coefficients | | | | |
|---|---|---|---|---|
| | A12 | A14 | A16 | A18 | A20 |
| R1 | −2.4474E−12 | 3.7757E−14 | 2.8887E−15 | −2.1003E−16 | −4.4343E−18 |
| R2 | −3.7469E−12 | 1.6654E−13 | −1.2155E−14 | −1.4512E−16 | −5.6567E−18 |
| R3 | 4.6467E−10 | 6.7316E−11 | 4.8193E−12 | 1.2936E−13 | −3.1561E−14 |
| R4 | −1.0398E−08 | 6.2989E−14 | 1.1965E−15 | 2.1613E−16 | 6.0487E−18 |
| R5 | −1.0398E−08 | 6.2989E−14 | 1.1965E−15 | 2.1613E−16 | 6.0487E−18 |
| R6 | 8.8262E−09 | −7.2552E−10 | −6.1913E−15 | −7.3682E−16 | 2.0815E−16 |
| R7 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 |
| R9 | −5.1442E−10 | −4.4341E−10 | 1.2467E−11 | 9.8336E−13 | −6.3991E−14 |
| R10 | 1.3012E−10 | −1.6007E−11 | −4.2627E−11 | −2.2183E−12 | 3.0694E−13 |

In table 2, K is a conic coefficient, and A4, A6, A8, A10, A12, A14, A16, A18 and A20 are aspheric surface coefficients.

IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of each lens of the camera optical lens 10 according to the present embodiment. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 |
|---|---|---|---|
| P1R1 | 0 | | |
| P1R2 | 1 | 3.945 | |
| P2R1 | 0 | | |
| P2R2 | 0 | | |
| P3R1 | 0 | | |
| P3R2 | 2 | 1.955 | 2.875 |
| P4R1 | 0 | | |
| P4R2 | 0 | | |
| P5R1 | 1 | 3.085 | |
| P5R2 | 1 | 1.525 | |

TABLE 4

| | Number(s) of arrest points | Arrest point position 1 |
|---|---|---|
| P1R1 | 0 | |
| P1R2 | 0 | |
| P2R1 | 0 | |
| P2R2 | 0 | |
| P3R1 | 0 | |
| P3R2 | 0 | |
| P4R1 | 0 | |
| P4R2 | 0 | |
| P5R1 | 1 | 2.445 |
| P5R2 | 0 | |

In addition, in the subsequent Table 17, various parameters of Embodiments 1 and values corresponding to the parameters specified in the above conditions are shown.

Figure 2:
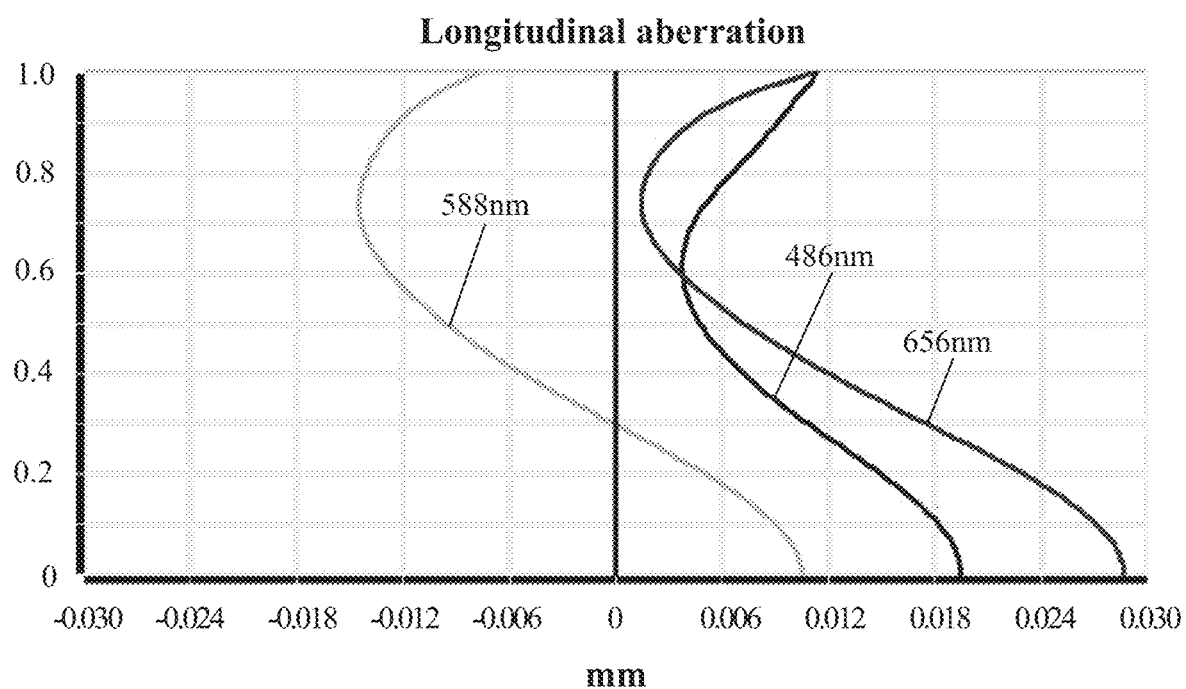
FIG. 2 is a schematic diagram of a longitudinal aberration of the camera optical lens shown in FIG. 1.
Figure 3:
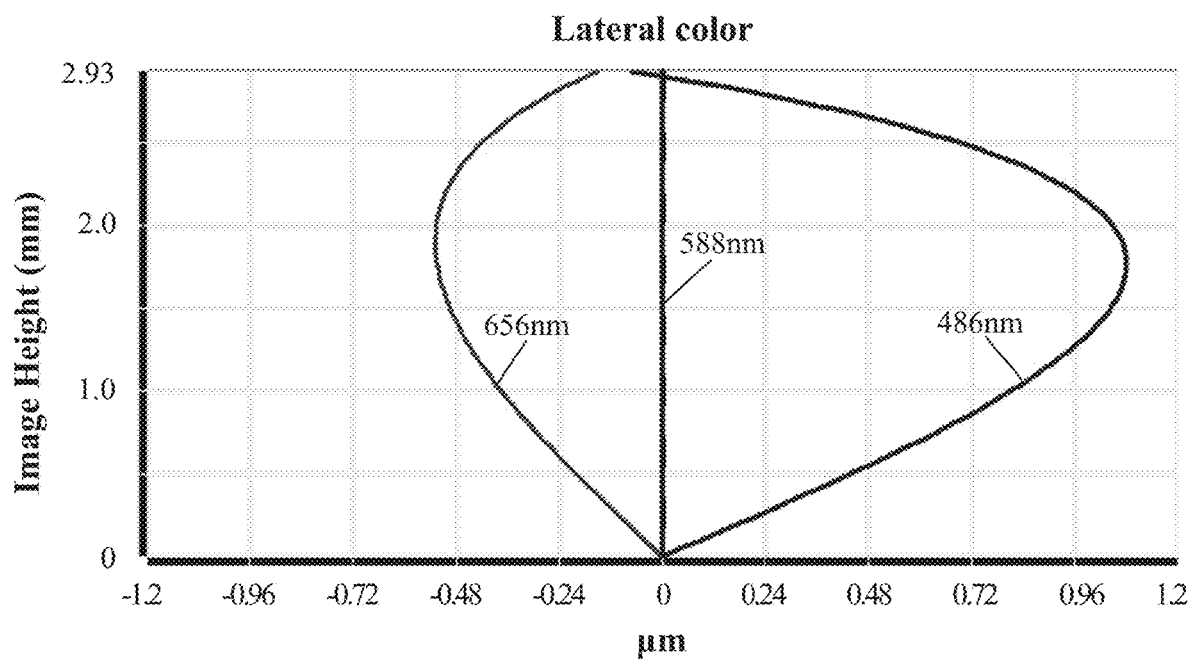
FIG. 3 is a schematic diagram of a lateral color of the camera optical lens shown in FIG. 1.
Figure 4:
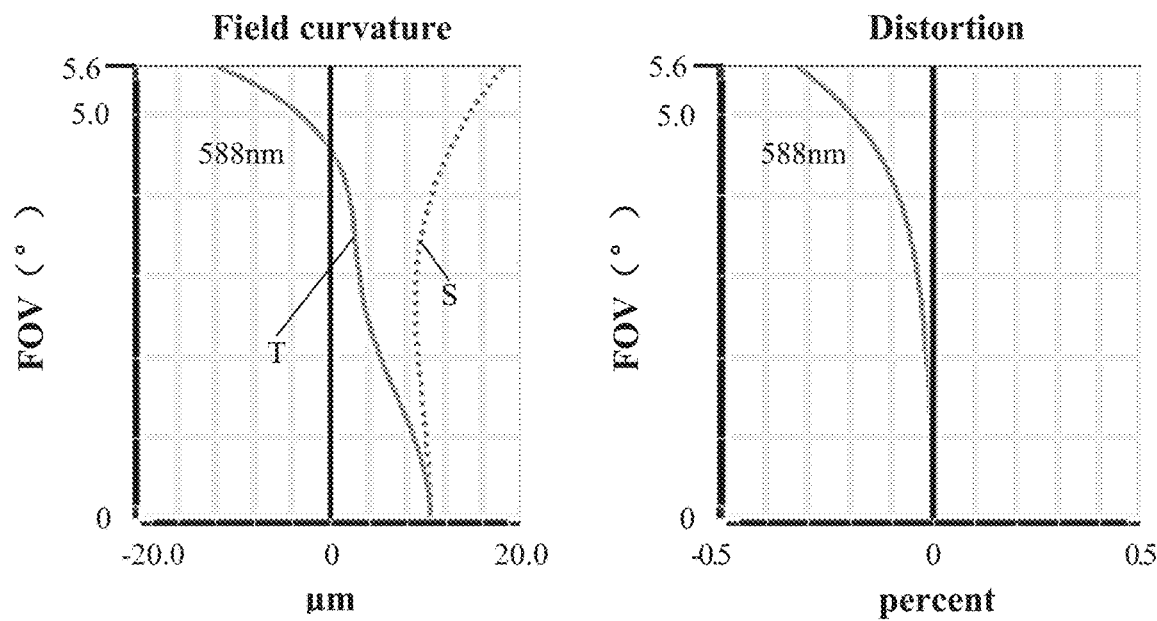
FIG. 4 is a schematic diagram of a field curvature and a distortion of the camera optical lens shown in FIG. 1.
Figure 5:
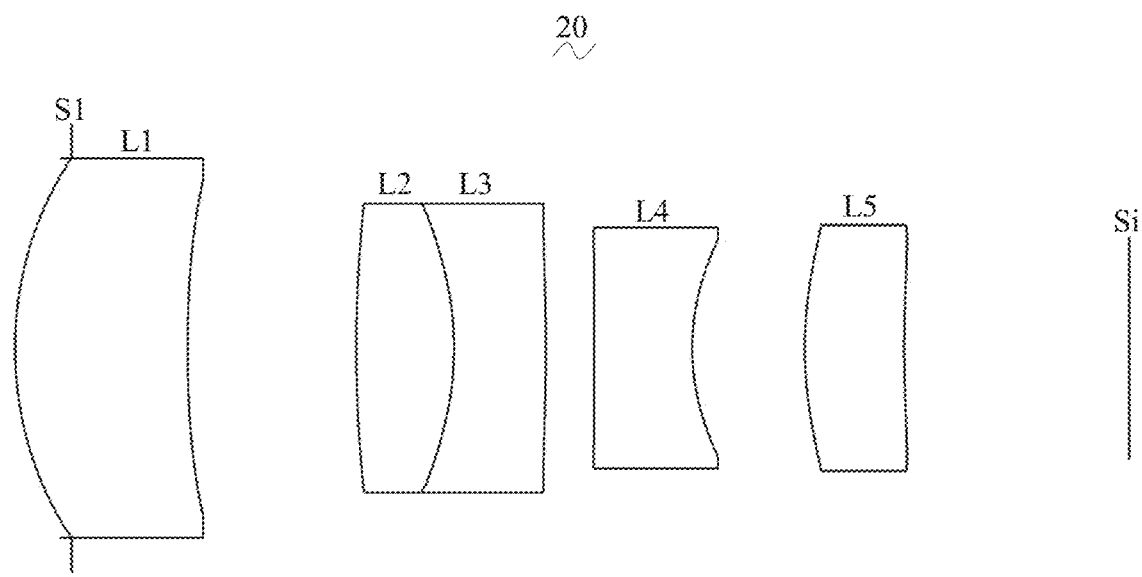
FIG. 5 is a schematic diagram of a structure of a camera optical lens according to Embodiment 2 of the present disclosure.

FIG. 2 and FIG. 3 illustrate a longitudinal aberration and a lateral color with wavelengths of 588 nm, 486 nm and 656 nm after passing the camera optical lens 10, respectively. FIG. 4 illustrates a field curvature and a distortion with a wavelength of 588 nm after passing the camera optical lens 10. A field curvature S in FIG. 4 is a field curvature in a sagittal direction, and T is a field curvature in a tangential direction.

In this Embodiment, an entrance pupil diameter of the camera optical lens 10 is 10.000 mm, an image height of 1.0H is 2.93 mm, and an FOV (field of view) in a diagonal direction is 11.20°. Thus, the camera optical lens 10 has a large aperture and a long focal length, and is ultra-thin, thereby achieving excellent optical characteristics.

Embodiment 2

Embodiment 2 is basically the same as Embodiment 1 and involves symbols having the same meanings as Embodiment 1, and only differences therebetween will be described in the following.

An object-side surface of the second lens L2 is convex in the proximal region.

Table 5 and Table 6 show design data of a camera optical lens 20 in Embodiment 2 of the present disclosure.

TABLE 5

| | R | d | | nd | | vd |
|---|---|---|---|---|---|---|
| S1 | ∞ | d0= | 0.000 | | | |
| R1 | 9.313 | d1= | 4.600 | nd1 | 1.5440 | v1 | 56.04 |
| R2 | 32.182 | d2= | 4.500 | | | |
| R3 | 46.511 | d3= | 2.600 | nd2 | 1.5233 | v2 | 54.52 |
| R4 | −9.261 | d4= | 0.000 | | | |
| R5 | −9.261 | d5= | 2.450 | nd3 | 1.6614 | v3 | 20.41 |
| R6 | −45.505 | d6= | 1.282 | | | |
| R7 | −556.818 | d7= | 2.620 | nd4 | 1.5345 | v4 | 57.09 |
| R8 | 5.990 | d8= | 3.000 | | | |
| R9 | 10.536 | d9= | 2.650 | nd5 | 1.6614 | v5 | 20.41 |
| R10 | 32.515 | d10= | 6.000 | | | |

Table 6 shows aspherical surface data of each lens of the camera optical lens 20 in Embodiment 2 of the present disclosure.

TABLE 6

| | Conic coefficient | Aspheric surface coefficients | | | |
|---|---|---|---|---|---|
| | k | A4 | A6 | A8 | A10 |
| R1 | −2.6905E−01 | 1.2390E−04 | −4.0793E−07 | 7.4101E−08 | −1.9388E−09 |
| R2 | 3.9576E+01 | 2.0479E−04 | −6.0027E−06 | −2.7745E−07 | 5.5842E−09 |
| R3 | −1.5684E+02 | 9.8465E−04 | −6.2264E−05 | −3.1369E−07 | 3.3323E−08 |
| R4 | 2.9866E+00 | −3.0438E−03 | 6.2632E−04 | −2.1850E−05 | −1.3201E−06 |
| R5 | 2.9866E+00 | −3.0438E−03 | 6.2632E−04 | −2.1850E−05 | −1.3201E−06 |
| R6 | 1.6685E+00 | 1.9221E−04 | 8.1303E−05 | −4.2937E−06 | −4.7984E−07 |
| R7 | −2.0000E+02 | 0.0000E+00 | 0.0000E+00 | 0.0000E+00 | 0.0000E+00 |
| R8 | −9.1828E−01 | 0.0000E+00 | 0.0000E+00 | 0.0000E+00 | 0.0000E+00 |
| R9 | −2.2992E+00 | −6.3397E−05 | −2.0417E−05 | −1.2604E−06 | 1.2936E−08 |
| R10 | −9.7640E+01 | −1.9434E−04 | −4.1291E−05 | −2.2508E−08 | 3.2923E−08 |

| | Aspheric surface coefficients | | | | |
|---|---|---|---|---|---|
| | A12 | A14 | A16 | A18 | A20 |
| R1 | −1.9000E−11 | 1.7144E−12 | 4.4697E−14 | −1.5457E−15 | −3.7416E−18 |
| R2 | 2.3857E−10 | −1.3157E−11 | −2.6315E−13 | 3.9615E−14 | −1.6547E−15 |
| R3 | 1.2097E−08 | 3.0786E−10 | −5.0803E−11 | −3.6917E−12 | 2.3018E−13 |
| R4 | −8.0429E−09 | 5.0337E−09 | 3.3863E−10 | 4.9472E−12 | −1.8249E−12 |
| R5 | −8.0429E−09 | 5.0337E−09 | 3.3863E−10 | 4.9472E−12 | −1.8249E−12 |
| R6 | 1.8992E−08 | 2.0577E−09 | 1.0130E−10 | −9.4264E−12 | −3.9022E−13 |
| R7 | 0.0000E+00 | 0.0000E+00 | 0.0000E+00 | 0.0000E+00 | 0.0000E+00 |
| R8 | 0.0000E+00 | 0.0000E+00 | 0.0000E+00 | 0.0000E+00 | 0.0000E+00 |
| R9 | 2.4820E−09 | −3.3820E−09 | 1.3125E−10 | 6.3024E−11 | −4.7171E−12 |
| R10 | −4.4450E−08 | 2.6283E−09 | 5.3619E−10 | −4.5544E−11 | 1.9462E−13 |

Table 7 and table 8 show design data of inflexion points and arrest points of each lens of the camera optical lens 20.

TABLE 7

| | Number(s) of inflexion points | Inflexion point position 1 | Inflexion point position 2 |
|---|---|---|---|
| P1R1 | 0 | | |
| P1R2 | 0 | | |
| P2R1 | 2 | 3.555 | 3.695 |
| P2R2 | 0 | | |
| P3R1 | 0 | | |
| P3R2 | 2 | 1.825 | 3.185 |
| P4R1 | 0 | | |
| P4R2 | 0 | | |
| P5R1 | 1 | 2.865 | |
| P5R2 | 1 | 1.795 | |

TABLE 8

| | Number of arrest points | Arrest point position 1 |
|---|---|---|
| P1R1 | 0 | |
| P1R2 | 0 | |
| P2R1 | 0 | |
| P2R2 | 0 | |
| P3R1 | 0 | |
| P3R2 | 0 | |
| P4R1 | 0 | |
| P4R2 | 0 | |
| P5R1 | 0 | |
| P5R2 | 1 | 2.815 |

In addition, in the subsequent Table 17, various parameters of Embodiments 2 and values corresponding to the parameters specified in the above conditions are shown.

Figure 6:
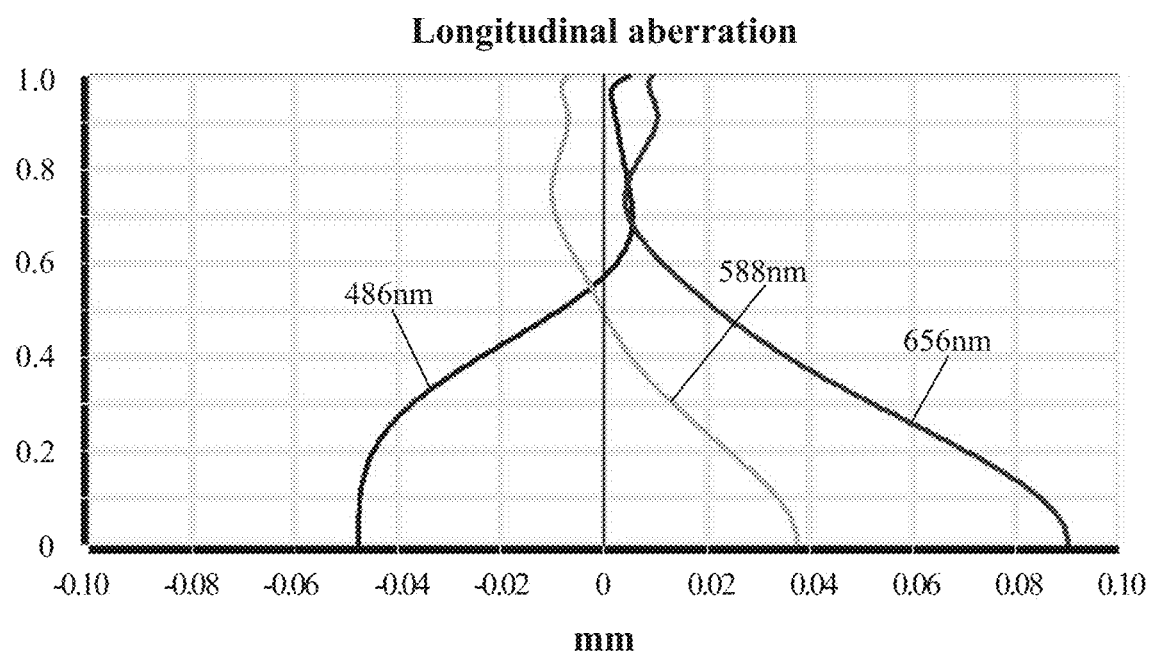
FIG. 6 is a schematic diagram of a longitudinal aberration of the camera optical lens shown in FIG. 5.
Figure 7:
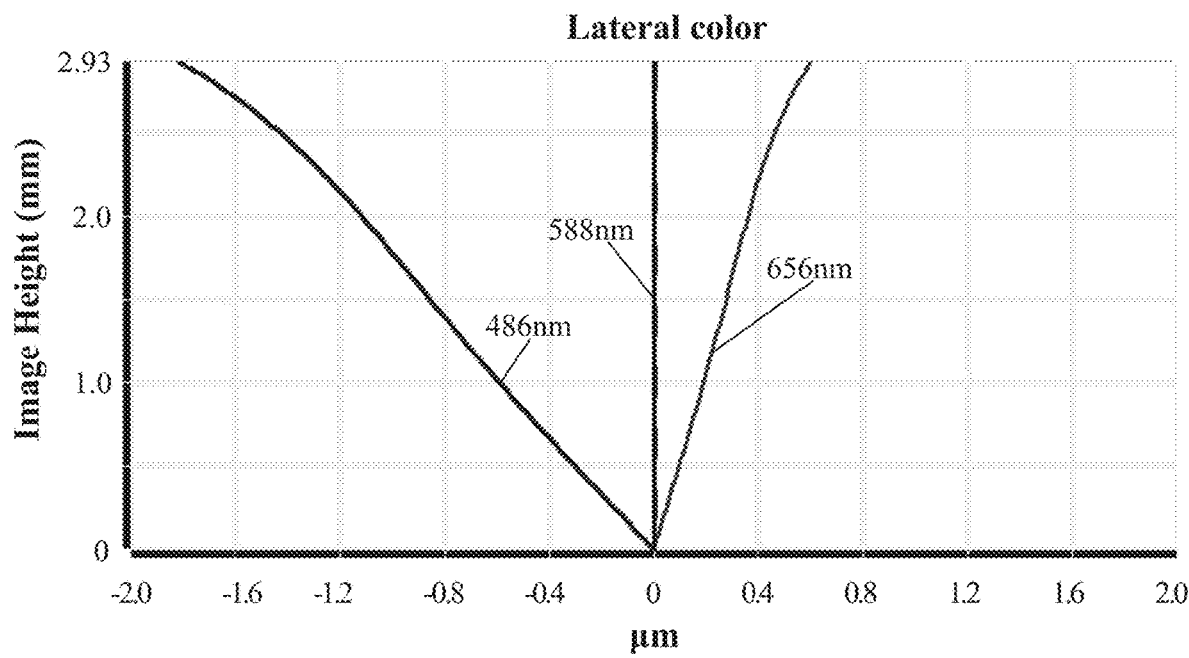
FIG. 7 is a schematic diagram of a lateral color of the camera optical lens shown in FIG. 5.
Figure 8:
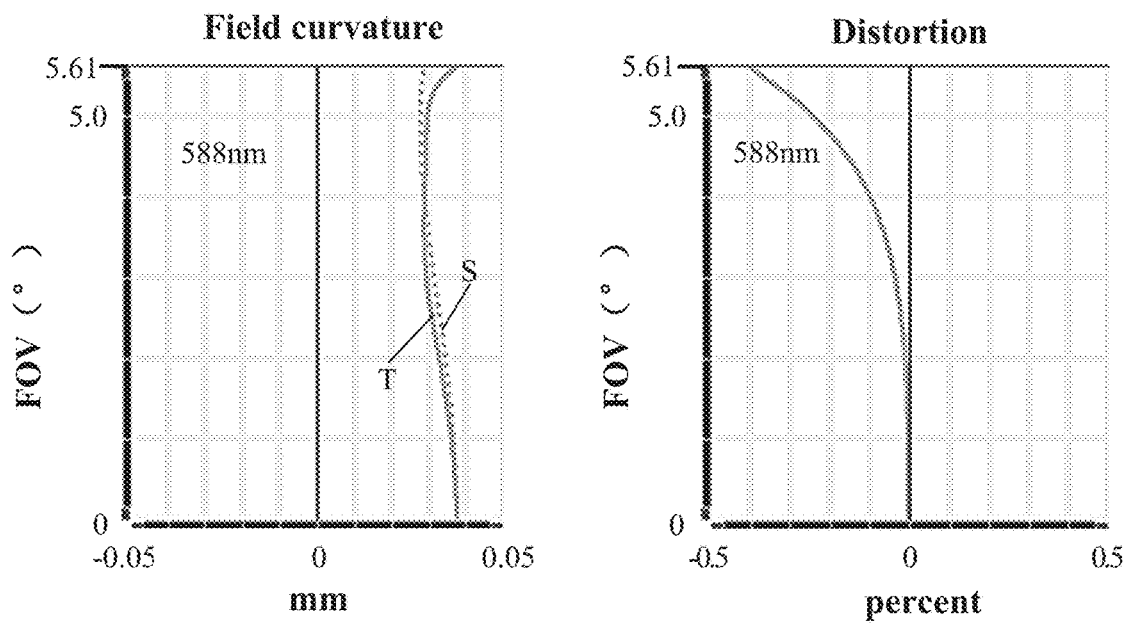
FIG. 8 is a schematic diagram of a field curvature and a distortion of the camera optical lens shown in FIG. 5.
Figure 9:
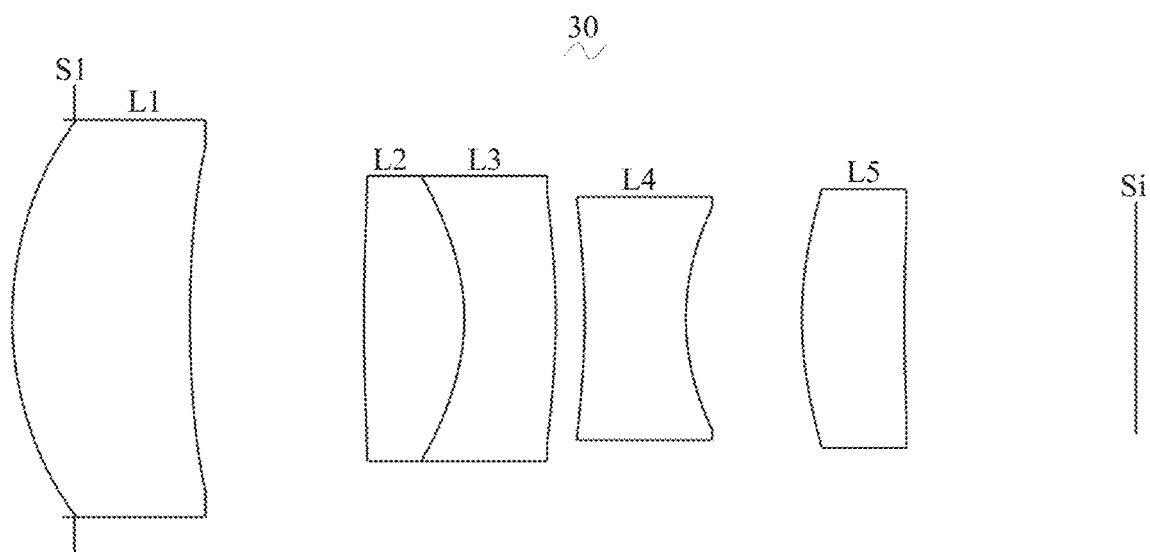
FIG. 9 is a schematic diagram of a structure of a camera optical lens according to Embodiment 3 of the present disclosure.

FIG. 6 and FIG. 7 illustrate a longitudinal aberration and a lateral color of light with wavelengths of 588 nm, 486 nm and 656 nm after passing the camera optical lens 20. FIG. 8 illustrates a field curvature and a distortion of light with a wavelength of 588 nm after passing the camera optical lens 20. A field curvature S in FIG. 8 is a field curvature in a sagittal direction, and T is a field curvature in a tangential direction.

In an embodiment, an entrance pupil diameter of the camera optical lens 20 is 10.000 mm, an image height of 1.0H is 2.93 mm, and an FOV (field of view) in the diagonal direction is 11.22°. Thus, the camera optical lens 20 has a large aperture and a long focal length, and is ultra-thin, thereby achieving excellent optical characteristics.

Embodiment 3

Embodiment 3 is basically the same as Embodiment 1 and involves symbols having the same meanings as Embodiment 1, and only differences therebetween will be described in the following.

An object-side surface of the second lens L2 is convex in the proximal region.

Table 9 and Table 10 show design data of a camera optical lens 30 in Embodiment 3 of the present disclosure.

TABLE 9

|     | R       | d    |       | nd     |     | vd    |
|-----|---------|------|-------|--------|-----|-------|
| S1  | ∞       | d0=  | 0.000 |        |     |       |
| R1  | 8.541   | d1=  | 4.600 | nd1 1.5440 | v1 | 56.04 |
| R2  | 28.992  | d2=  | 4.500 |        |     |       |
| R3  | 42.568  | d3=  | 2.600 | nd2 1.5233 | v2 | 54.52 |
| R4  | −5.185  | d4=  | 0.000 |        |     |       |
| R5  | −5.185  | d5=  | 2.363 | nd3 1.6614 | v3 | 20.41 |
| R6  | −18.373 | d6=  | 0.750 |        |     |       |
| R7  | −18.019 | d7=  | 2.620 | nd4 1.5345 | v4 | 57.09 |
| R8  | 5.880   | d8=  | 3.000 |        |     |       |
| R9  | 9.203   | d9=  | 2.650 | nd5 1.6614 | v5 | 20.41 |
| R10 | 38.987  | d10= | 6.000 |        |     |       |

Table 10 shows aspherical surface data of each lens of the camera optical lens 30 in Embodiment 3 of the present disclosure.

TABLE 10

|     | Conic coefficient | Aspheric surface coefficients | | | |
|-----|-------------------|-----------|-----------|-----------|-----------|
|     | k                 | A4        | A6        | A8        | A10       |
| R1  | −2.6548E−01       | 7.3301E−05  | 1.1891E−06  | 7.1539E−08  | −7.9572E−10 |
| R2  | 3.2421E+01        | −8.4568E−05 | 1.3954E−06  | −4.4457E−08 | 4.5658E−09  |
| R3  | −1.9999E+02       | −2.2478E−04 | −1.0526E−05 | 1.9293E−06  | −7.1067E−08 |
| R4  | −9.9543E−02       | 2.4252E−03  | −1.0743E−04 | 1.6760E−06  | 5.5172E−07  |
| R5  | −9.9543E−02       | 2.4252E−03  | −1.0743E−04 | 1.6760E−06  | 5.5172E−07  |
| R6  | −5.6285E+00       | 5.0647E−04  | −2.9629E−05 | 2.6380E−06  | −1.6447E−08 |
| R7  | −4.3350E+01       | 0.0000E+00  | 0.0000E+00  | 0.0000E+00  | 0.0000E+00  |
| R8  | −6.8705E−01       | 0.0000E+00  | 0.0000E+00  | 0.0000E+00  | 0.0000E+00  |
| R9  | −2.5933E+00       | −2.8722E−04 | −1.2526E−05 | 3.7596E−06  | −4.7981E−07 |
| R10 | −1.9602E+02       | −2.9638E−04 | −1.9819E−05 | −1.9390E−06 | 5.9539E−07  |

|     | Aspheric surface coefficients | | | | |
|-----|-----------|-----------|-----------|-----------|-----------|
|     | A12       | A14       | A16       | A18       | A20       |
| R1  | 8.4492E−12  | 1.3235E−12  | 3.7540E−15  | −1.4694E−15 | 2.9984E−17  |
| R2  | −6.0081E−11 | −1.8986E−11 | −1.2596E−14 | 6.6827E−14  | −2.2921E−15 |
| R3  | −2.4108E−09 | 3.9814E−11  | 7.4187E−12  | 6.7467E−13  | −3.4875E−14 |
| R4  | −4.3693E−09 | −1.3063E−09 | −9.3112E−11 | 1.6741E−12  | 2.6123E−13  |
| R5  | −4.3693E−09 | −1.3063E−09 | −9.3112E−11 | 1.6741E−12  | 2.6123E−13  |
| R6  | 3.4223E−09  | −6.2468E−10 | 8.9699E−13  | −2.8814E−12 | 2.9180E−13  |
| R7  | 0.0000E+00  | 0.0000E+00  | 0.0000E+00  | 0.0000E+00  | 0.0000E+00  |
| R8  | 0.0000E+00  | 0.0000E+00  | 0.0000E+00  | 0.0000E+00  | 0.0000E+00  |
| R9  | 2.3049E−08  | 1.0072E−09  | −9.4856E−11 | −4.9857E−12 | 3.5674E−13  |
| R10 | −4.9160E−08 | −9.2062E−10 | 3.9352E−10  | −2.1141E−11 | 2.3239E−13  |

Table 11 and Table 12 show design data inflexion points and arrest points of each lens in the camera optical lens 30.

TABLE 11

|      | Number(s) of inflexion points | Inflexion point position 1 | Inflexion point position 2 |
|------|---|-------|-------|
| P1R1 | 0 |       |       |
| P1R2 | 0 |       |       |
| P2R1 | 2 | 2.215 | 3.345 |
| P2R2 | 0 |       |       |
| P3R1 | 0 |       |       |
| P3R2 | 1 | 2.825 |       |
| P4R1 | 0 |       |       |
| P4R2 | 0 |       |       |
| P5R1 | 0 |       |       |
| P5R2 | 1 | 1.725 |       |

TABLE 12

|      | Number of arrest points | Arrest point position 1 |
|------|---|-------|
| P1R1 | 0 |       |
| P1R2 | 0 |       |
| P2R1 | 0 |       |
| P2R2 | 0 |       |
| P3R1 | 0 |       |
| P3R2 | 0 |       |
| P4R1 | 0 |       |
| P4R2 | 0 |       |
| P5R1 | 0 |       |
| P5R2 | 1 | 2.945 |

In addition, in the subsequent Table 17, various parameters of Embodiments 3 and values corresponding to the parameters specified in the above conditions are shown.

Figure 10:
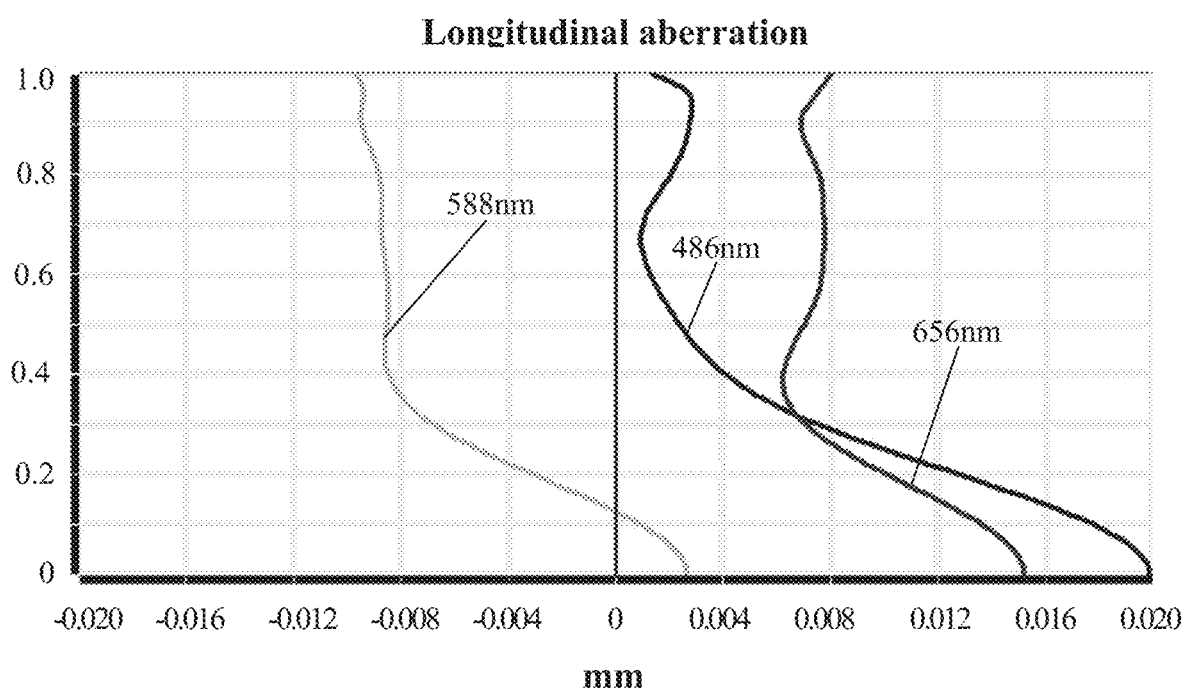
FIG. 10 is a schematic diagram of a longitudinal aberration of the camera optical lens shown in FIG. 9.
Figure 11:
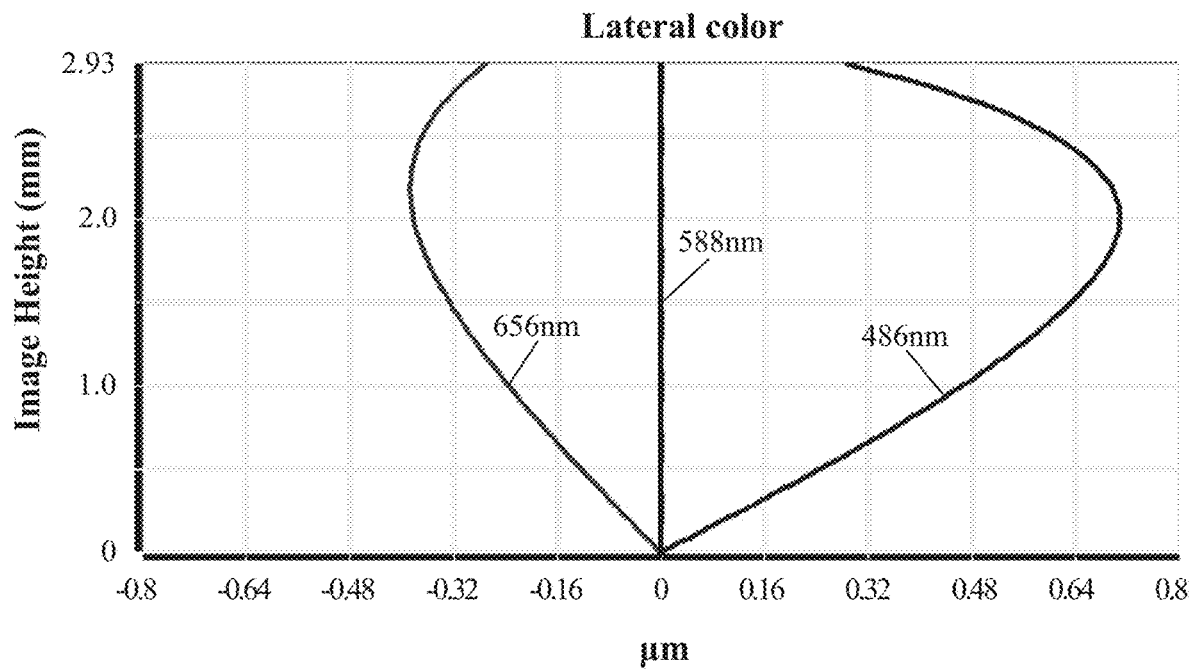
FIG. 11 is a schematic diagram of a lateral color of the camera optical lens shown in FIG. 9.
Figure 12:
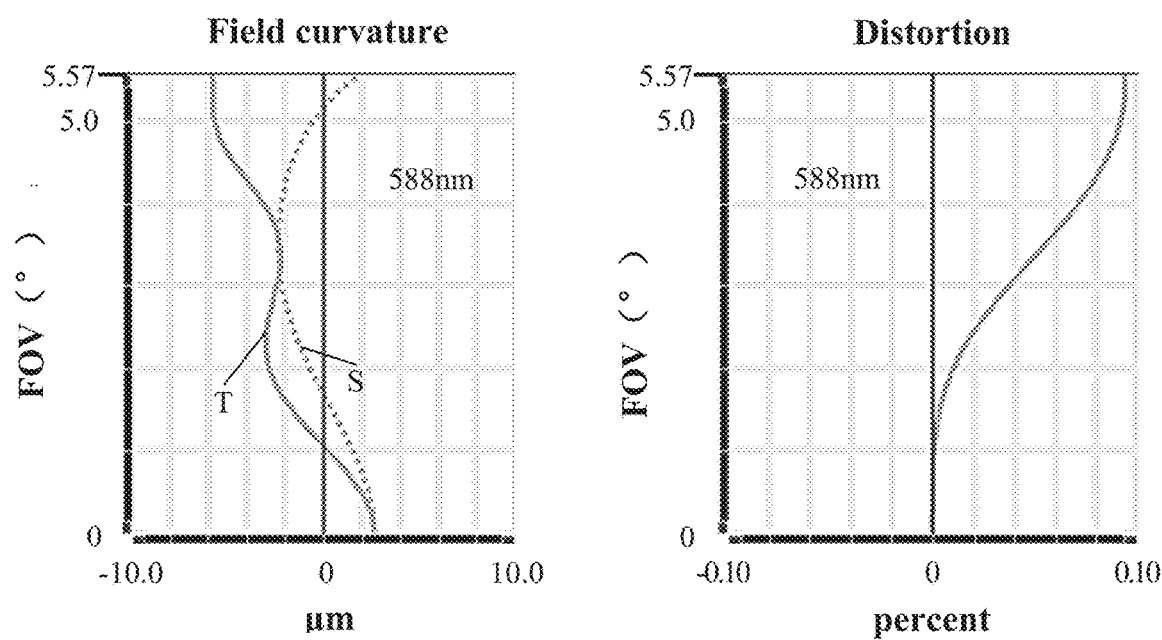
FIG. 12 is a schematic diagram of a field curvature and a distortion of the camera optical lens shown in FIG. 9.
Figure 13:
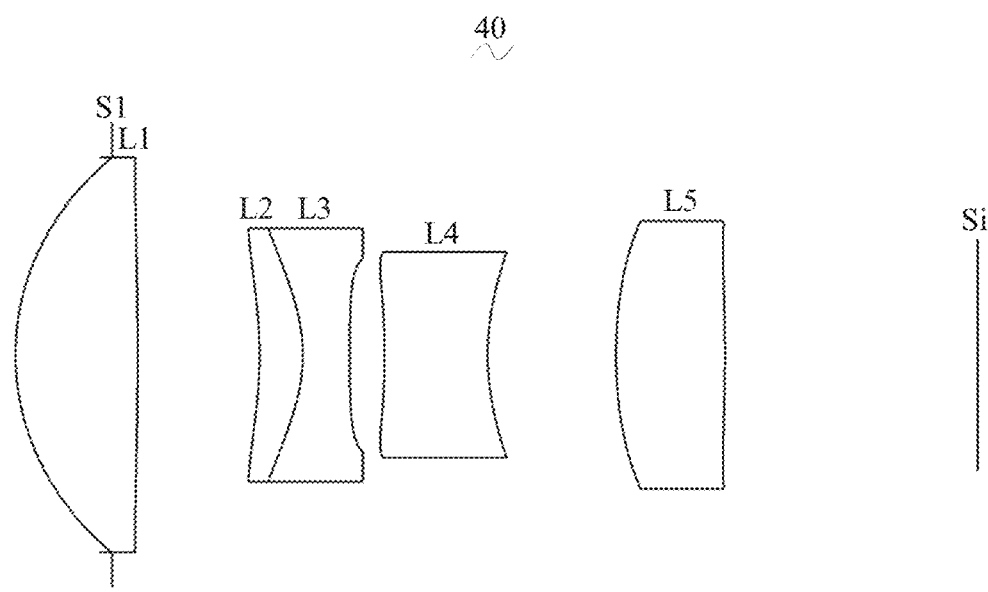
FIG. 13 is a schematic diagram of a structure of a camera optical lens according to Embodiment 4 of the present disclosure.

FIG. 10 and FIG. 11 illustrate a longitudinal aberration and a lateral color of light with wavelengths of 588 nm, 486 nm and 656 nm after passing the camera optical lens 30. FIG. 12 illustrates a field curvature and a distortion of light with a wavelength of 588 nm after passing the camera optical lens 30. A field curvature S in FIG. 12 is a field curvature in a sagittal direction, and T is a field curvature in a tangential direction.

In an embodiment, an entrance pupil diameter of the camera optical lens 30 is 10.000 mm, an image height of 1.0H is 2.93 mm, and an FOV (field of view) in the diagonal direction is 11.14°. Thus, the camera optical lens 30 has a large aperture and a long focal length, and is ultra-thin, thereby achieving excellent optical characteristics.

Embodiment 4

Embodiment 4 is basically the same as Embodiment 1 and involves symbols having the same meanings as Embodiment 1, and only differences therebetween will be described in the following.

An image-side surface of the first lens L1 is convex in the proximal region, an image-side surface of the third lens L3 is concave in the proximal region, and an image-side surface of the fifth lens L5 is convex in the proximal region.

Table 13 and Table 14 show design data of a camera optical lens 40 in Embodiment 4 of the present disclosure.

TABLE 13

|  | R | d |  | nd |  | vd |
|---|---|---|---|---|---|---|
| S1 | ∞ | d0= | 0.000 | | | |
| R1 | 6.026 | d1= | 3.142 | nd1 | 1.5439 | v1 | 55.95 |
| R2 | −89.169 | d2= | 3.133 | | | |
| R3 | −10.591 | d3= | 1.115 | nd2 | 1.5251 | v2 | 56.24 |
| R4 | −4.109 | d4= | 0.000 | | | |
| R5 | −4.109 | d5= | 1.206 | nd3 | 1.6614 | v3 | 20.41 |
| R6 | 77.925 | d6= | 0.895 | | | |
| R7 | −21.103 | d7= | 2.650 | nd4 | 1.5440 | v4 | 56.04 |
| R8 | 6.433 | d8= | 3.300 | | | |
| R9 | 11.285 | d9= | 2.800 | nd5 | 1.6614 | v5 | 20.41 |
| R10 | −39.461 | d10= | 6.500 | | | |

Table 14 shows aspherical surface data of each lens of the camera optical lens 40 in Embodiment 4 of the present disclosure.

TABLE 14

| | Conic coefficient | Aspheric surface coefficients | | | |
|---|---|---|---|---|---|
| | k | A4 | A6 | A8 | A10 |
| R1 | −4.3724E−01 | 1.3961E−04 | 2.3651E−06 | 6.2005E−08 | 8.8724E−10 |
| R2 | 5.9477E+00 | 1.0358E−04 | 1.7026E−06 | 1.8204E−08 | −2.2300E−09 |
| R3 | −9.8797E+00 | 8.7185E−04 | 4.8501E−05 | −2.0825E−07 | −1.4259E−07 |
| R4 | −4.9602E−01 | 4.4708E−03 | 6.2394E−05 | −6.9550E−06 | 1.0745E−07 |
| R5 | −4.9602E−01 | 4.4708E−03 | 6.2394E−05 | −6.9550E−06 | 1.0745E−07 |
| R6 | 4.2906E+01 | 2.9390E−03 | 3.1496E−04 | 2.9038E−05 | 3.3859E−06 |
| R7 | 5.7462E+00 | −1.7874E−03 | 2.5299E−04 | 5.1993E−05 | 3.4145E−06 |
| R8 | −2.8555E+00 | 0.0000E+00 | 0.0000E+00 | 0.0000E+00 | 0.0000E+00 |
| R9 | −1.1101E+01 | 1.7742E−03 | −2.7959E−05 | 3.5145E−07 | −4.8891E−08 |
| R10 | −3.2726E+01 | 4.3432E−04 | 6.2792E−05 | −5.0482E−06 | −2.5652E−08 |

| | Aspheric surface coefficients | | | | |
|---|---|---|---|---|---|
| | A12 | A14 | A16 | A18 | A20 |
| R1 | 3.1947E−11 | −8.7008E−13 | −3.5625E−14 | −2.9153E−16 | 9.6543E−17 |
| R2 | −2.7295E−11 | 6.9317E−13 | 7.3007E−14 | 2.5173E−15 | −1.1298E−16 |
| R3 | −5.5702E−09 | 2.1283E−10 | 4.6758E−11 | 6.0155E−13 | −1.6705E−13 |
| R4 | 4.3503E−08 | 2.0837E−09 | −7.8880E−10 | −8.8086E−11 | 9.2811E−12 |
| R5 | 4.3503E−08 | 2.0837E−09 | −7.8880E−10 | −8.8086E−11 | 9.2811E−12 |
| R6 | 3.4930E−07 | 4.0913E−08 | 4.3568E−09 | 7.6746E−10 | 8.0801E−11 |
| R7 | 1.3298E−07 | 1.1532E−08 | 2.3016E−09 | 3.1246E−10 | −2.5809E−11 |
| R8 | 0.0000E+00 | 0.0000E+00 | 0.0000E+00 | 0.0000E+00 | 0.0000E+00 |
| R9 | 4.5900E−09 | 6.9129E−10 | −2.5851E−13 | 2.5702E−12 | −4.9503E−13 |
| R10 | 2.0563E−08 | 1.6373E−09 | −1.1317E−10 | 1.2276E−11 | −1.2536E−12 |

Table 15 and table 16 show design data of inflexion points and arrest points of each lens of the camera optical lens 40.

TABLE 15

| | Number(s) of inflexion points | Inflexion point position 1 |
|---|---|---|
| P1R1 | 0 | |
| P1R2 | 1 | 2.675 |
| P2R1 | 1 | 2.025 |
| P2R2 | 0 | |
| P3R1 | 0 | |
| P3R2 | 0 | |
| P4R1 | 1 | 1.695 |
| P4R2 | 0 | |

TABLE 15-continued

| | Number(s) of inflexion points | Inflexion point position 1 |
|---|---|---|
| P5R1 | 0 | |
| P5R2 | 1 | 1.675 |

TABLE 16

| | Number of arrest points | Arrest point position 1 |
|---|---|---|
| P1R1 | 0 | |
| P1R2 | 1 | 4.515 |
| P2R1 | 0 | |
| P2R2 | 0 | |
| P3R1 | 0 | |
| P3R2 | 0 | |
| P4R1 | 1 | 2.205 |
| P4R2 | 0 | |
| P5R1 | 0 | |
| P5R2 | 1 | 2.715 |

In addition, in the subsequent Table 17, various parameters of Embodiments 4 and values corresponding to the parameters specified in the above conditions are shown.

Figure 14:
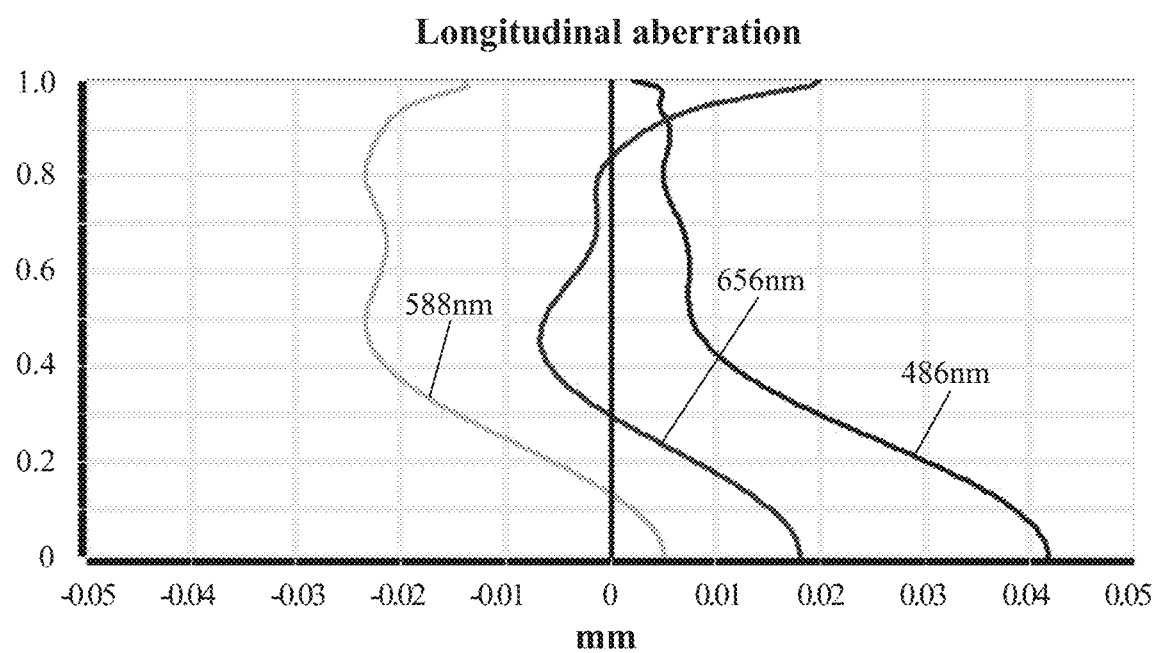
FIG. 14 is a schematic diagram of a longitudinal aberration of the camera optical lens shown in FIG. 13.
Figure 15:
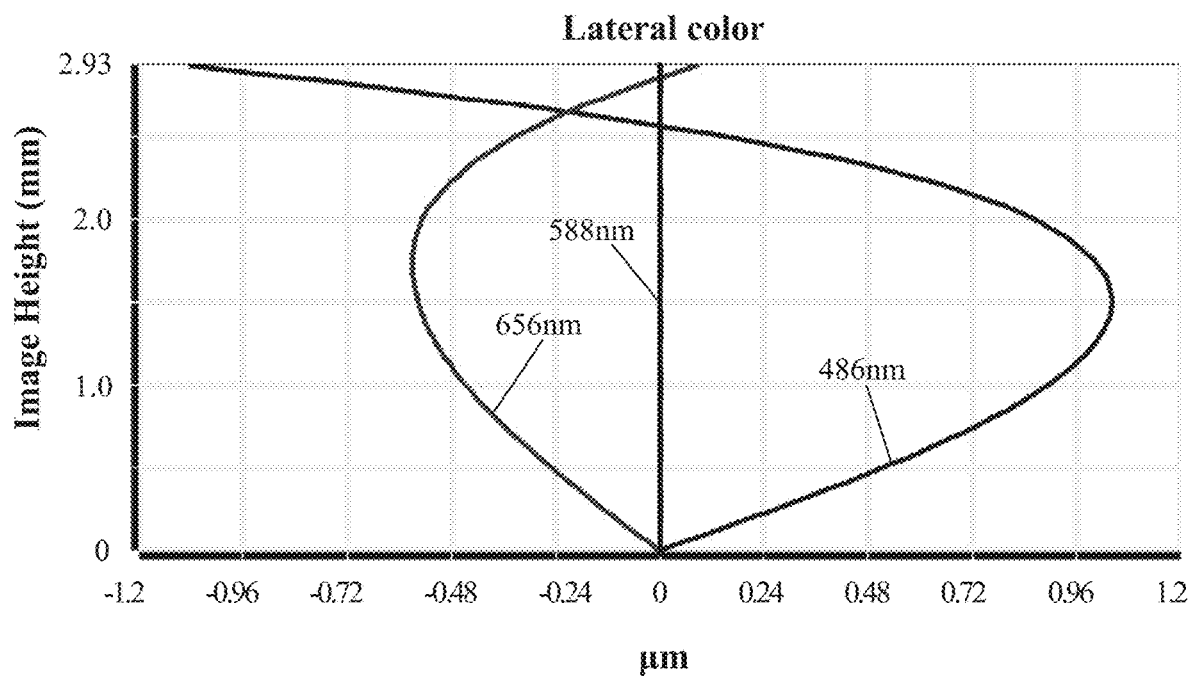
FIG. 15 is a schematic diagram of a lateral color of the camera optical lens shown in FIG. 13.
Figure 16:
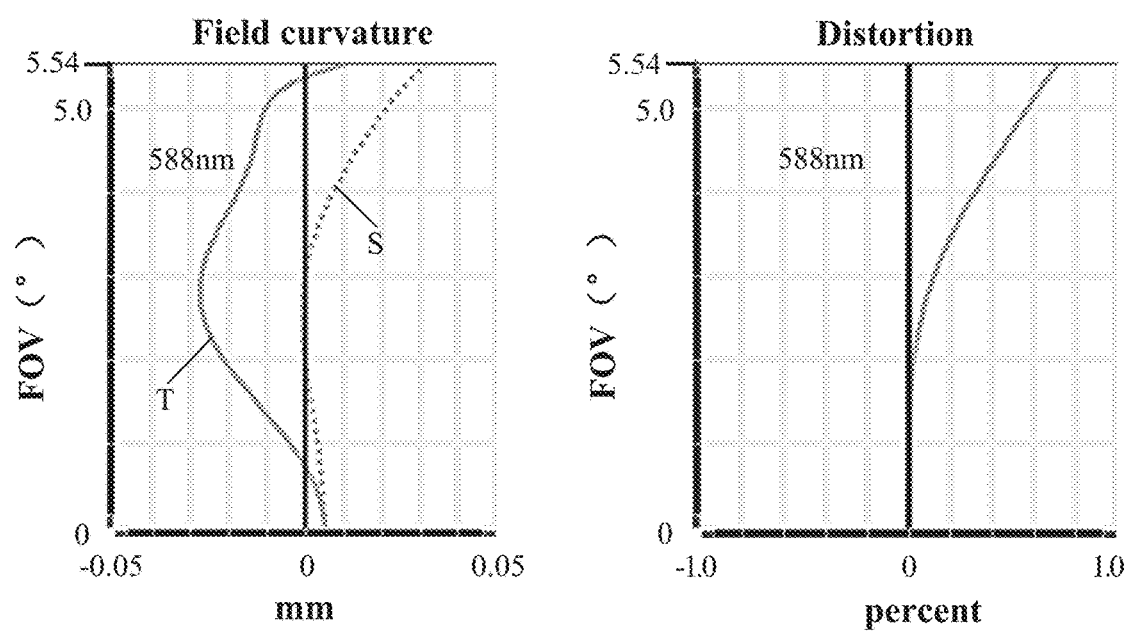
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 588 nm, 486 nm and 656 nm after passing the camera optical lens 40. FIG. 16 illustrates a field curvature and a distortion of light with a wavelength of 588 nm after passing the camera optical lens 40. A field curvature S in FIG. 16 is a field curvature in a sagittal direction, and T is a field curvature in a tangential direction.

In an embodiment, an entrance pupil diameter of the camera optical lens 40 is 10.000 mm, an image height of 1.0H is 2.93 mm, and an FOV (field of view) in the diagonal direction is 11.08°. Thus, the camera optical lens 40 has a large aperture and a long focal length, and is ultra-thin, thereby achieving excellent optical characteristics.

Table 17 in the following shows values corresponding to the conditions and values of other relevant parameters according to the aforementioned conditions in the Embodiment 1, Embodiment 2, Embodiment 3, and Embodiment 4.

TABLE 17

| Parameters and conditions | Embodiment 1 | Embodiment 2 | Embodiment 3 | Embodiment 4 |
| --- | --- | --- | --- | --- |
| f | 30.000 | 30.000 | 30.000 | 30.000 |
| f1 | 15.281 | 22.497 | 20.622 | 10.501 |
| f2 | 11.227 | 14.998 | 9.001 | 12.071 |
| f3 | −8.864 | −18.065 | −11.761 | −5.867 |
| f4 | −9.169 | −11.070 | −7.989 | −8.766 |
| f5 | 15.411 | 22.485 | 17.590 | 13.566 |
| f12 | 9.394 | 12.210 | 9.442 | 7.737 |
| Fno | 3.00 | 3.00 | 3.00 | 3.00 |
| d4 | 0.00 | 0.00 | 0.00 | 0.00 |
| f1/f | 0.51 | 0.75 | 0.69 | 0.35 |

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. A camera optical lens comprising, in order from an object side to an image side:
   a first lens having a positive refractive power;
   a second lens having a positive refractive power;
   a third lens having a negative refractive power;
   a fourth lens having a negative refractive power; and
   a fifth lens having a positive refractive power;
   wherein the camera optical lens satisfies following conditions:

$d4=0.00$;

$0.35 \leq f1/f \leq 0.75$; and $3.50 \leq d2/d6 \leq 6.00$;

where
   d4 denotes an on-axis distance from the image-side surface of the second lens to the object-side surface of the third lens;
   f denotes a focal length of the camera optical lens;
   f1 denotes a focal length of the first lens;
   d2 denotes an on-axis distance from the image-side surface of the first lens to the object-side surface of the second lens; and
   d6 denotes an on-axis distance from the image-side surface of the third lens to the object-side surface of the fourth lens.

2. The camera optical lens according to claim 1, wherein the camera optical lens further satisfies a condition of:

$0.30 \leq f2/f \leq 0.50$ where
   f2 denotes a focal length of the second lens.

3. The camera optical lens according to claim 1, wherein the camera optical lens further satisfies following conditions:

$-3.67 \leq (R1+R2)/(R1-R2) \leq -0.58$;

$0.06 \leq d1/TTL \leq 0.25$;

where
   R1 denotes a curvature radius of the object-side surface of the first lens;
   R2 denotes a curvature radius of the image-side surface of the first lens;
   d1 denotes an on-axis thickness of the first lens; and
   TTL denotes a total optical length from the object-side surface of the first lens to an image surface of the camera optical lens along an optical axis.

4. The camera optical lens according to claim 1, wherein the camera optical lens further satisfies following conditions:

$0.33 \leq (R3+R4)/(R3-R4) \leq 3.40$; and $0.02 \leq d3/TTL \leq 0.13$;

where
   R3 denotes a curvature radius of the object-side surface of the second lens;
   R4 denotes a curvature radius of the image-side surface of the second lens;
   d3 denotes an on-axis thickness of the second lens; and
   TTL denotes a total optical length from the object-side surface of the first lens to an image surface of the camera optical lens along an optical axis.

5. The camera optical lens according to claim 1, wherein the camera optical lens further satisfies following conditions:

$-1.20 \leq f3/f \leq -0.13$;

$-3.57 \leq (R5+R6)/(R5-R6) \leq -0.60$; and $0.02 \leq d5/TTL \leq 0.14$;

Where
   f3 denotes a focal length of the third lens;
   R5 denotes a curvature radius of the object-side surface of the third lens;
   R6 denotes a curvature radius of the image-side surface of the third lens;
   d5 denotes an on-axis thickness of the third lens; and
   TTL denotes a total optical length from the object-side surface of the first lens to an image surface of the camera optical lens along an optical axis.

6. The camera optical lens according to claim 1, wherein the camera optical lens further satisfies following conditions:

$-0.74 \leq f4/f \leq -0.18$;

$0.25 \leq (R7+R8)/(R7-R8) \leq 1.47$; and $0.04 \leq d7/TTL \leq 0.16$;

where
   f4 denotes a focal length of the fourth lens;
   R7 denotes a curvature radius of the object-side surface of the fourth lens;
   R8 denotes a curvature radius of the image-side surface of the fourth lens;
   d7 denotes an on-axis thickness of the fourth lens; and
   TTL denotes a total optical length from the object-side surface of the first lens to an image surface of the camera optical lens along an optical axis.

7. The camera optical lens according to claim 1, wherein the camera optical lens further satisfies following conditions:

$0.23 \leq f5/f \leq 1.12$;

$-3.92 \leq (R9+R10)/(R9-R10) \leq -0.37$; and $0.04 \leq d9/TTL \leq 0.17$;

where f5 denotes a focal length of the fifth lens;

R9 denotes a curvature radius of the object-side surface of the fifth lens;

R10 denotes a curvature radius of the image-side surface of the fifth lens;

d9 denotes an on-axis thickness of the fifth lens; and

TTL denotes a total optical length from the object-side surface of the first lens to an image surface of the camera optical lens along an optical axis.

8. The camera optical lens according to claim 1, wherein the camera optical lens further satisfies a condition of:

$f/IH \geq 10$ where

IH denotes an image height of the camera optical lens.

9. The camera optical lens according to claim 1, wherein the camera optical lens further satisfies a condition of:

$Fno \leq 3.00$ where

Fno denotes an F number of the camera optical lens.

\* \* \* \* \*